United States Patent

[11] 3,614,211

[72] Inventor Eugene C. Letter
Penfield, N.Y.
[21] Appl. No. 335,694
[22] Filed Jan. 3, 1964
[45] Patented Oct. 19, 1971
[73] Assignee Bausch & Lomb Incorporated
Rochester, N.Y.

[54] ELECTRICALLY ACTUATED SHUTTER
1 Claim, 3 Drawing Figs.
[52] U.S. Cl. ............................................. 350/285,
350/312
[51] Int. Cl. ............................................. G02f 1/34
[50] Field of Search ............................................. 88/61;
350/285

[56] References Cited
UNITED STATES PATENTS
| | | | |
|---|---|---|---|
| 2,986,982 | 6/1961 | Kaprelian | 88/61 A |
| 2,997,922 | 8/1961 | Kaprelian | 88/61 J |
| 3,008,374 | 11/1961 | Kreisman | 88/61 A |

*Primary Examiner*—Verlin R. Pendegrass
*Attorneys*—Frank C. Parker and David E. Dougherty

CLAIM: 1. A shutter comprising a pair of prisms, a surface of one of said prisms disposed in a light path at an angle greater than the critical angle of internal reflection with respect to an incident light ray, means defining a fluid reservoir between said prisms, a fluid disposed in said reservoir having an index of refraction approximately equal to the index of refraction of said prisms, said fluid contacting said surface when the shutter is in a first operative position, and means ejecting said fluid from said reservoir to thereby change the reflective characteristics of said shutter.

PATENTED OCT 19 1971
3,614,211
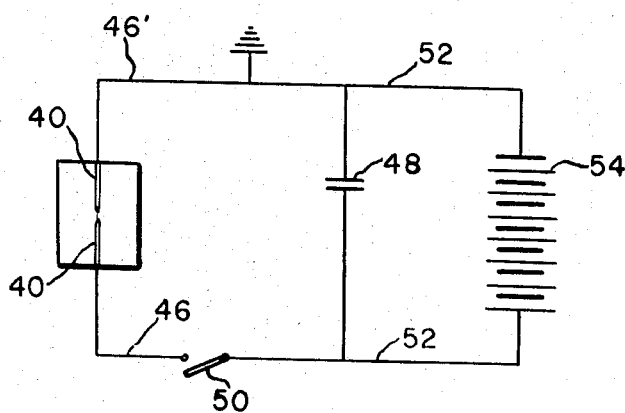
FIG. 2
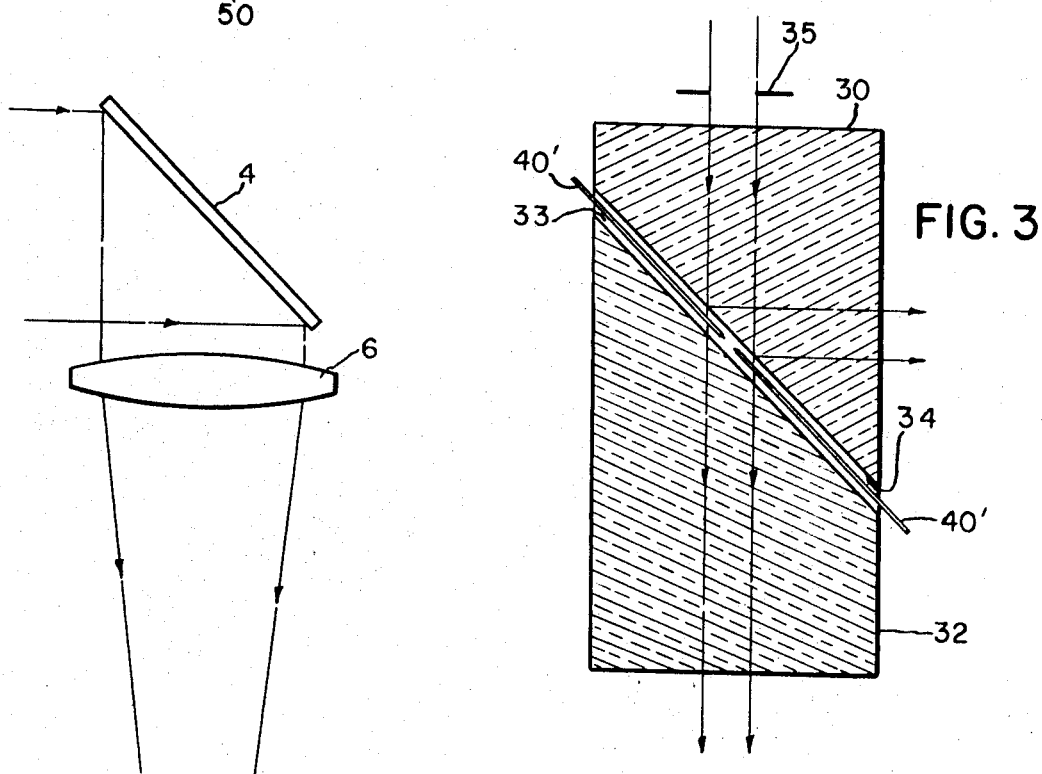
FIG. 3
FIG. 1
EUGENE C. LETTER
INVENTOR.
BY Frank C Parker
David Dougherty
ATTORNEYS

ELECTRICALLY ACTUATED SHUTTER

This invention relates to an optical shutter and more particularly to a reversible optical shutter for high-speed applications.

Studies of combustion, corona discharge, explosions, plastic and elastic deformation and shock wave phenomena frequently call for detailed photographs taken at shutter speeds of a few microseconds. Ballistics dynamic testing and chemical reactions also require pictures taken at similar speeds. At their relatively high speeds, it is also desirable to shutter a relatively large aperture. For example, a relatively large aperture allows adequate light to enter the optical system during the relatively short time intervals.

A high speed optical shutter according to the present invention may be opened or closed in less than 100 microseconds. In some cases the opening or closing speed is less than 50 microseconds. Accordingly, a system of this type may be used in combination with framing cameras. Further, because of the relatively large aperture which can be opened and closed at high speed, the devices are particularly applicable in any area requiring a relatively high speed light valve. Additionally, a shutter or light valve according to the invention may be triggered by an event itself. For example, a flash of light may be used to trigger the valve or electronic means may be incorporated for that purpose.

The operation of a shutter according to the present invention is based upon the principle of critical reflection. This well-known principle is explained in some detail in the text "Principles of Optics" by A.C. Harby and F. H. Perrin (1932) pp. 26 and 28 as well as in numerous other optical textbooks.

Briefly, a shutter according to the present invention comprises an optical element such as a prism which is disposed in a light path so that one surface is greater than the critical angle of internal reflection with respect to an incident light ray. A reservoir containing a mass of fluid is disposed adjacent the surface which is at an angle greater than the critical angle. Means are provided for displacing the fluid from the reservoir to thereby change the reflective characteristics of the element.

A presently preferred embodiment of the invention includes means for producing a shock wave to thereby displace a mass of optically absorbing material from the reservoir and depositing the optically absorbing material onto the surface which is disposed at an angle greater than the critical angle of internal reflection. The fluid mass of optically absorbing material consists essentially of carbon black dispersed in a liquid to thereby form a highly viscous or thixotropic fluid. For example, the material may have a pastelike consistency and yet it will wet a surface when applied thereto.

A second embodiment of the invention includes a pair of superposed optical elements such as prisms separated from each other by a fluid reservoir. The fluid in the reservoir should have an index of refraction $n_D$ approximately equal to the index of refraction $n_D$ of the prisms. When the fluid is in contact with the glass prisms it completes the optical continuity between the prisms, and the device transmits light. The fluid is ejected from the reservoir to thereby destroy the optical continuity. Destroying the optical continuity causes the light to be totally reflected by the surface of one of the prisms.

The invention will now be described in more detail in connection with the accompanying drawings; in which, FIG. 1 is a cross-sectional view illustrating a presently preferred embodiment of the invention;

FIG. 2 is a schematic diagram showing electrical means for closing the shutters shown in FIGS. 1 and 3; and, FIG. 3 is a cross-sectional view illustrating a second embodiment of the invention.

The first embodiment of the invention will be described in connection with FIGS. 1 and 2. Light rays are directed onto the shutter 2 by an inclined mirror 4 and lens 6. In the preferred embodiment, the shutter 2 is shown in an open condition and acts as an inclined mirror for directing light rays to a camera 8.

The shutter 2 includes an optical element such as a prism 10 which is disposed in a light path so that a surface 11 is disposed at an angle greater than the critical angle of internal reflection with respect to an incident light ray. The prism is mounted in a housing 12 which may comprise a rubber or plastic block. Other suitable materials or mounting means may be employed.

A glass block 13 defines a reservoir 14 or concave cavity which contains an optically absorbing fluid 15. The fluid comprises carbon black dispersed in a suitable carrier such as water. The fluid should be thixotropic or relatively viscous, for example, pastelike, in order to minimize the likelihood of the fluid being prematurely removed from the reservoir.

Various materials have been found to be satisfactory as a carrier. For example, a water dispersion may be used with a relatively low voltage to obtain a relatively fast closure time. However, since the index of refraction of water does not match the index of refraction of the prism 10, the "completeness" of closure is not as good as it is when the fluid index matches the prism index. Dispersions with silicone oil and glycerine carriers have also been employed and have been found satisfactory for time of closure, optical density, and dielectric properties.

A pair of electrodes 40 are disposed in the block 12. The electrodes 40 are relatively close to the surface 11 of the prism 10 and extend into the reservoir 14. The electrodes are disposed in coaxial alignment but are separated from each other. For example, a spacing of about ⅛ inch is used for an aperture of from ⅜ inch to 1 inch diameter.

The electrical circuit is shown in more detail in FIG. 2. The electrodes 40 are connected by leads 46, 46' in parallel with a capacitor 48 when a switch 50 is closed. The capacitor 48 is also connected by the leads 52 to electrical means 54 for producing a high voltage electrical discharge of between 2,000 and 20,000 volts. The capacitor 48 in one embodiment of the invention has a capacitance of between 1/10 and 2 microfarads. The capacitor is charged by the high voltage supply 54 and discharges across the electrodes 40 when the switch 50 is closed. The electrical discharge across the electrodes 40 creates a shock wave which ejects the fluid out of the reservoir to thereby change the condition of the shutter. For example, a 5,000 volt source of electricity coupled with a 1 microfarad capacitor closed a shutter of about ¾ inch diameter in about 100 microseconds. A 10,000 volt source coupled with a 1 microfarad capacitor closed a similar-sized shutter in about 50 microseconds.

In the operation of a device according to the presently preferred embodiment of the invention, the reservoir 13 contains a mass of optically absorbing fluid 15. The light rays which are incident upon the surface 11 are totally reflected thereby and directed toward the camera 8. In order to close the shutter, the switch 50 is closed to thereby produce an electrical discharge across the electrodes 40. The discharge displaces the optically absorbing fluid from the reservoir and deposits the fluid upon the surface 11. Depositing the absorbing fluid on the surface 11 overcomes the total reflection and absorbs the light rays to thereby close the light valve. The surface 11 may be cleaned to remove the optically absorbing fluid in order to restore the shutter to its open condition.

The second embodiment of the invention is illustrated in FIG. 3 wherein a pair of spaced prisms 30 and 32 are arranged in optical series. For example, the prism 30 is superposed on the prism 32 but in spaced relation thereto. The spacing defines a fluid reservoir 33. A pair of coaxially aligned electrodes 40' are disposed in the fluid reservoir and extend outwardly therefrom.

When the fluid reservoir 33 is filled with a fluid having an index of refraction $n_D$ which is approximately equal to the index of refraction $n_D$ of the prism, the element transmits light. The fluid completes the optical continuity. A surface 34 of the prism 30 is disposed in a light path at an angle greater than the critical angle of internal reflection with respect to an incident light ray. The light passing through an aperture stop 35 passes through the prism 30, fluid, and prism 32 when the reservoir is filled with a suitable fluid. For example, a suitable fluid may consist essentially of carbon tetrachloride when the prisms are made of quartz.

An electrical discharge across the electrodes 40' displaces the fluid from the reservoir 33 thereby destroying the optical continuity. When the fluid has been displaced, the incident light rays are totally reflected by the surface 34 thereby closing the shutter.

While several preferred embodiments of the invention have been illustrated in the specification, it will be understood that these forms are shown for purposes of illustration. The illustrated forms may be employed and embodied in various other forms or employed in other uses without departing from the spirit or the scope of the appended claims.

What is claimed is:

1. A shutter comprising a pair of prisms, a surface of one of said prisms disposed in a light path at an angle greater than the critical angle of internal reflection with respect to an incident light ray, means defining a fluid reservoir between said prisms, a fluid disposed in said reservoir having an index of refraction approximately equal to the index of refraction of said prisms, said fluid contacting said surface when the shutter is in a first operative position, and means ejecting said fluid from said reservoir to thereby change the reflective characteristics of said shutter.